United States Patent
Chang et al.

(10) Patent No.: US 11,121,917 B1
(45) Date of Patent: Sep. 14, 2021

(54) SYSTEMS AND METHODS FOR DYNAMICALLY ALLOCATING RESOURCES BASED ON CONFIGURABLE RESOURCE PRIORITY

(71) Applicant: Verizon Patent and Licensing Inc., Basking Ridge, NJ (US)

(72) Inventors: Patricia R. Chang, San Ramon, CA (US); Fred Weisbrod, Renton, WA (US); John Patrick Hickey, III, Metuchen, NJ (US); Anil K. Guntupalli, Irving, TX (US); Kirk Campbell, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/914,779

(22) Filed: Jun. 29, 2020

(51) Int. Cl.
*H04L 12/24* (2006.01)
*H04L 12/911* (2013.01)
*H04L 12/26* (2006.01)
*H04L 29/08* (2006.01)

(52) U.S. Cl.
CPC .......... *H04L 41/0806* (2013.01); *H04L 41/12* (2013.01); *H04L 41/50* (2013.01); *H04L 41/5054* (2013.01); *H04L 43/08* (2013.01); *H04L 43/0805* (2013.01); *H04L 47/782* (2013.01); *H04L 47/821* (2013.01); *H04L 67/10* (2013.01)

(58) Field of Classification Search
CPC ........................ H04L 29/0818–08189; H04L 29/08261–08279; H04L 41/0803–0806; H04L 41/0823–0836; H04L 41/0876–0886; H04L 41/0893; H04L 41/50–5025; H04L 41/5041–5054; H04L 43/08–0817; H04L 47/782; H04L 67/1004; H04L 67/101–1012; H04L 67/1029

See application file for complete search history.

(56) References Cited

U.S. PATENT DOCUMENTS

| | | | |
|---|---|---|---|
| 2016/0204923 A1* | 7/2016 | Ashok | H04L 67/10 709/226 |
| 2016/0269311 A1* | 9/2016 | Brown | H04L 41/0806 |
| 2018/0062928 A1* | 3/2018 | Beveridge | H04L 41/046 |
| 2018/0123932 A1* | 5/2018 | Shaw | H04L 47/24 |
| 2018/0159745 A1* | 6/2018 | Byers | H04L 43/08 |
| 2020/0313959 A1* | 10/2020 | Higuchi | H04L 67/12 |
| 2021/0105181 A1* | 4/2021 | Suzuki | G09G 5/38 |
| 2021/0126840 A1* | 4/2021 | Venkataramu | H04L 41/5019 |

* cited by examiner

*Primary Examiner* — Brendan Y Higa

(57) ABSTRACT

A system described herein may provide a technique for the dynamic selection of configurable resources in an environment that includes a hierarchical or otherwise differentiated arrangement of configurable resources. The environment may include, or may be implemented by, a Distributed Resource Network ("DRN"), which may include hardware or virtual resources that may be configured, including the instantiation of containers, virtual machines, Virtualized Network Functions ("VNFs"), or the like. The DRN may be hierarchical in that some resources of the DRN may provide services to, and/or may otherwise be accessible to, a greater quantity of elements of the DRN or some other network.

20 Claims, 13 Drawing Sheets

SYSTEMS AND METHODS FOR DYNAMICALLY ALLOCATING RESOURCES BASED ON CONFIGURABLE RESOURCE PRIORITY

BACKGROUND

Networks, such as wireless networks, may make use of configurable resources to implement functions (e.g., network functions ("NFs"), Virtualized Network Functions ("VNFs"), etc.) at various portions of the network. Such configurable resources may include, or may implement, Multi-Access/Mobile Edge Computing ("MEC") devices, referred to sometimes herein simply as ("MECs"). The configurable resources may be hierarchical in nature, in that some configurable resources may provide services to, and/or may otherwise be accessible by, a greater quantity of elements associated with the network than other configurable resources. Generally speaking, configurable resources that are deployed at the "edge" of a network may provide services to fewer network elements with relatively low latency, while configurable resources that are deployed at more "central" portions of the network may provide services to more network elements but with relatively greater latency.

DETAILED DESCRIPTION OF THE PREFERRED EMBODIMENTS

The following detailed description refers to the accompanying drawings. The same reference numbers in different drawings may identify the same or similar elements.

Embodiments described herein provide for the dynamic selection of configurable resources in an environment that includes a hierarchical or otherwise differentiated arrangement of configurable resources. For example, as discussed below, the environment may include, or may be implemented by, a Distributed Resource Network ("DRN"), which may include hardware or virtual resources that may be configured. For example, such configuration may include the instantiation of containers, virtual machines, VNFs, or the like. As further discussed below, the DRN may be hierarchical in that some resources of the DRN may provide services to, and/or may otherwise be accessible to, a greater quantity of elements of the DRN or some other network. In some embodiments, the DRN may be, may implement, or may include a core of a wireless network, such as a Fifth Generation ("5G") core ("5GC"). In some embodiments, some or all of the DRN may implement other portions of the wireless network, such as a RAN, a fronthaul network, or a backhaul network.

Figure 1:
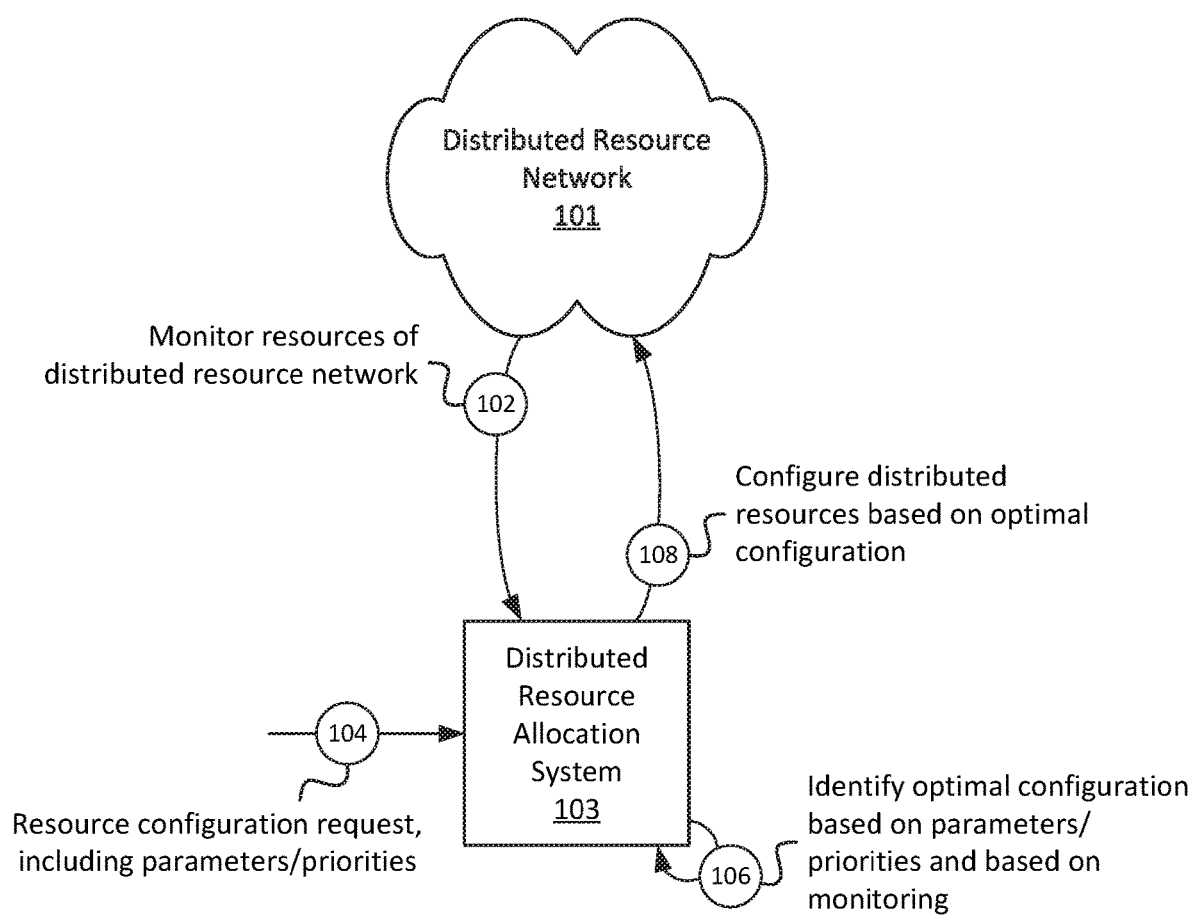
FIG. 1 illustrates an example overview of one or more embodiments described herein, in which a Distributed Resource Allocation System ("DRAS") may select and configure particular configurable resources of a Distributed Resource Network ("DRN") based on parameters included in a configuration request and further based on monitoring the configurable resources of the DRN.

As shown in FIG. 1, DRN 101 may be communicatively coupled with Distributed Resource Allocation System ("DRAS") 103. For example, one or more configurable resources of DRN 101 may implement an application programming interface ("API") (e.g., the Kubernetes API or some other suitable API) via which such configurable resources may communicate with DRAS 103. Additionally, or alternatively, DRN 101 may include one or more devices or systems that serve as an interface to facilitate communications between the configurable resources of DRN 101 and DRAS 103. Via such interface (or interfaces), DRAS 103 may monitor (at 102) resources of DRN 101. For example, DRAS 103 may receive, on an ongoing basis (e.g., a periodic or intermittent basis), information regarding the status of one or more of the configurable resources of DRN 101. Such monitored information may include information relating to the availability of resources (e.g., processing resources, memory resources, storage resources, network resources, power resource, and/or other types of resources) at particular resource centers of DRN 101.

Figure 2A:
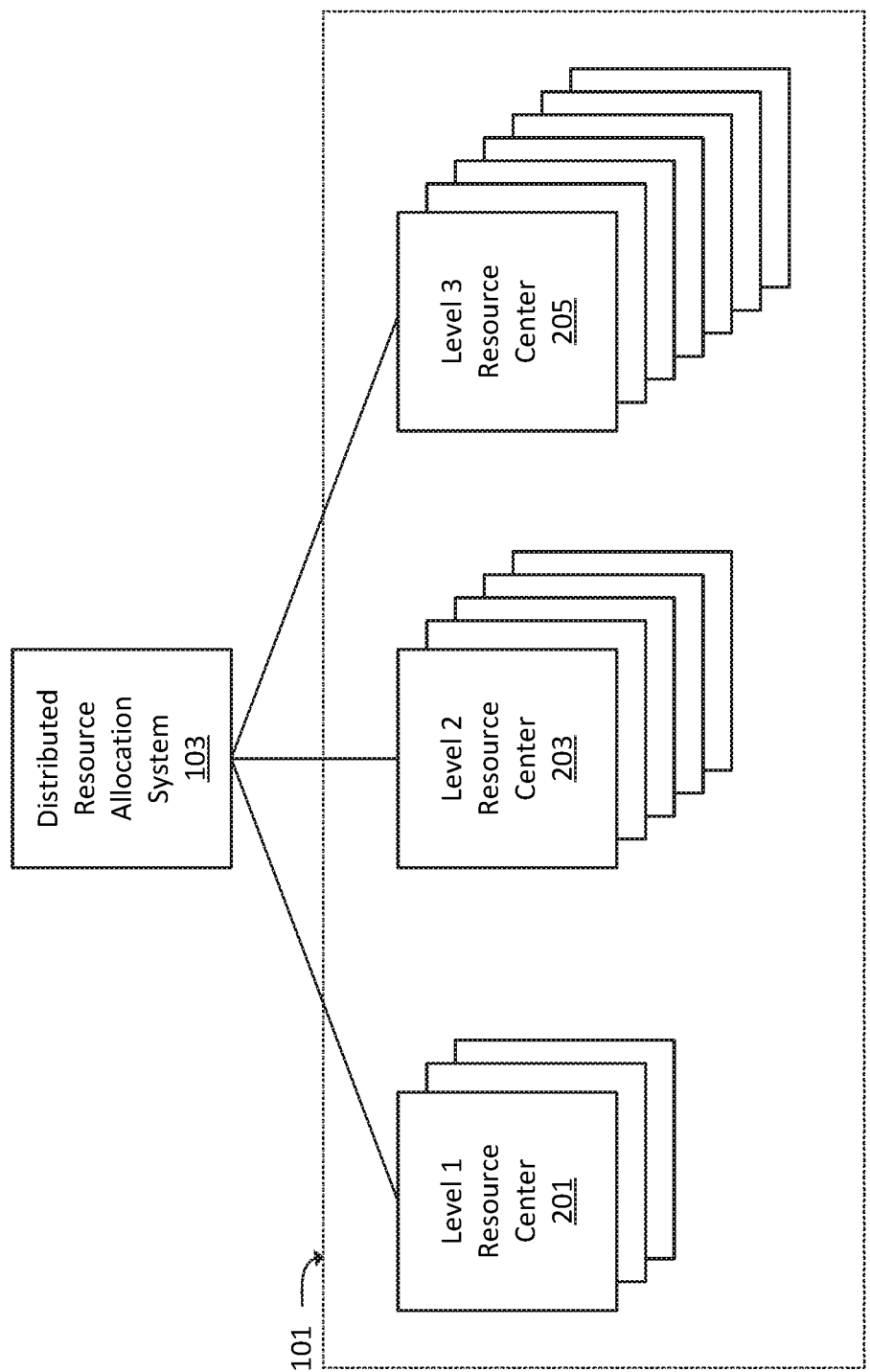
FIGS. 2A and 2B illustrate an example hierarchical arrangement of a DRN, in accordance with some embodiments.

For example, as shown in FIG. 2A, DRN 101 may include multiple resource centers 201, 203, and/or 205 (referred to herein as "resource centers 201-205"). Such resources may, in some embodiments, be deployed in a hierarchical manner, in which resource centers of different levels of the hierarchy may provide different coverage areas and/or performance (e.g., latency). For example, Level 1 resource center 201 may provide services to, and/or may otherwise be accessible to, a relatively large quantity of network elements of DRN 101 (or some other network), may serve network traffic originating from or arriving within a particular geographic location, and/or may otherwise be associated with a relatively large coverage area. In this manner, Level 1 resource center 201 may be considered as being a relatively "central" element of DRN 101. Because Level 1 resource center 201 is relatively "central," latency of communications to or from DRAS 103 may be relatively higher than communications to or from "edge" elements of DRN 101.

For example, DRAS 103 may include Level 3 resource centers 205, which may be located at "edges" of DRAS 103 (e.g., deployed physically closer to coverage areas served by Level 3 resource centers 205). Level 3 resource centers 205 may each be associated with a relatively smaller coverage area, and may accordingly offer relatively lower latency than Level 1 resource centers 201 and/or Level 2 resource centers 203. For example, since Level 3 resource centers 205 are located closer to the "edge" of DRN 101, traffic to or from Level 3 resource centers 205 may traverse fewer network hops or distance than traffic to or from Level 1 or Level 2 resource centers.

As Level 1 resource centers 201 provide greater coverage area than Level 2 resource centers 203 or Level 3 resource centers 205, DRN 101 may include fewer Level 1 resource centers 201 than Level 2 resource centers 203 or Level 3 resource centers 205. Similarly, as Level 3 resource centers 205 provide lesser coverage area than Level 1 resource centers 201 or Level 2 resource centers 203, DRN 101 may include more Level 3 resource centers 203 than Level 1 resource centers 201 or Level 2 resource centers 203.

As shown in FIG. 2A, DRAS 103 may be communicatively coupled to some or all of resource centers 201-205. For example, as noted above, each resource center 201-205 may implement an API and/or some other suitable communication technique to communicate with DRAS 103 (e.g., to provide status information and/or other parameters associated with respective resource centers 201-205, to receive configuration information from DRAS 103, or the like). In some embodiments, while not shown here, and as noted above, DRN 101 may include one or more devices or systems that serve as an interface between one or more resource centers 201-205 and DRAS 103, via which resource centers 201-205 and DRAS 103 may communicate. While concepts described herein (e.g., with respect to FIG. 2A and as further discussed below) in the context of three levels of a hierarchical arrangement, in practice, similar concepts may be applied to two levels of a hierarchical arrangement, and/or to hierarchical arrangements of resource centers that include greater than three levels.

Figure 2B:
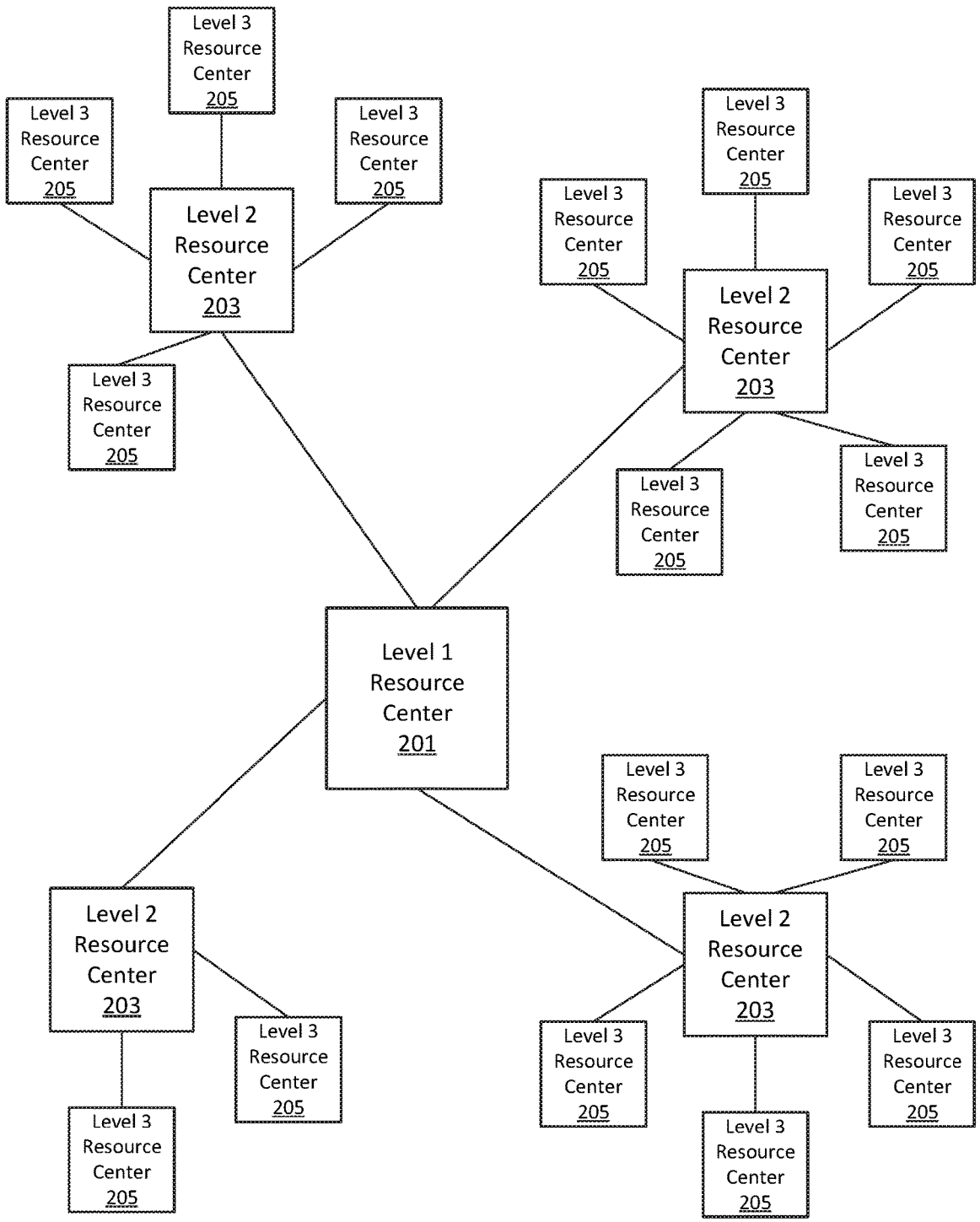

FIG. 2B further illustrates an example hierarchical arrangement of a set of resource centers 201-205 of DRN 101. As shown, Level 1 resource center 201 may be communicatively coupled to a set of Level 2 resource centers 203, which in turn may each be communicatively coupled to a respective set of Level 3 resource centers 205. In some embodiments, Level 1 resource center 201 may be a "central" resource center of Level 1 resource center 201. While one Level 1 resource center 201 is shown here, in practice, DRN 101 may include multiple Level 1 resource centers 201.

Further, as noted above, Level 3 resource centers 205 may be deployed at "edges" of DRN 101. For example, Level 3 resource centers 205 may be associated with a RAN of a wireless network. In some embodiments, for instance, Level 3 resource centers 205 may implement, and/or may be communicatively coupled to, a base station (e.g., a Next Generation Node B ("gNB")), a Distributed Unit ("DU"), and/or some other device or system that is associated with the RAN. For example, Level 3 resource centers 205 may send and/or receive traffic to and/or from devices that are "external" to DRN 101 (e.g., traffic to and/or from User Equipment ("UE"), such as wireless telephones or other types of devices), and/or may otherwise process traffic sent to or from such devices.

Level 2 resource centers 203 may aggregate traffic received or processed by multiple associated Level 3 resource centers 205, and may forward such aggregated traffic to Level 1 resource center 201, and/or may otherwise process the aggregated traffic. Further, Level 2 resource centers 203 may receive traffic from Level 1 resource center 201, and may appropriately route or distribute the traffic to one or more Level 3 resource centers 205. For example, a given Level 2 resource center 203 may receive traffic for a particular device (e.g., a UE) that is communicatively coupled to a particular Level 3 resource center 205, and may process and/or forward the traffic to the particular Level 3 resource center 205. In some embodiments, Level 2 resource center 203 may propagate traffic, configuration parameters, instructions, and/or other communications to Level 3 resource centers 205 that are communicatively coupled to Level 2 resource center 203. Similarly, Level 1 resource center 201 may aggregate traffic from multiple Level 2 resource centers 203, and/or may forward traffic to one or more Level 2 resource centers 203 as appropriate. As noted above, one or more resource centers 201-205 may implement, and/or may otherwise be associated with, MECs or other devices or systems that process traffic and/or provide services.

Figure 3:
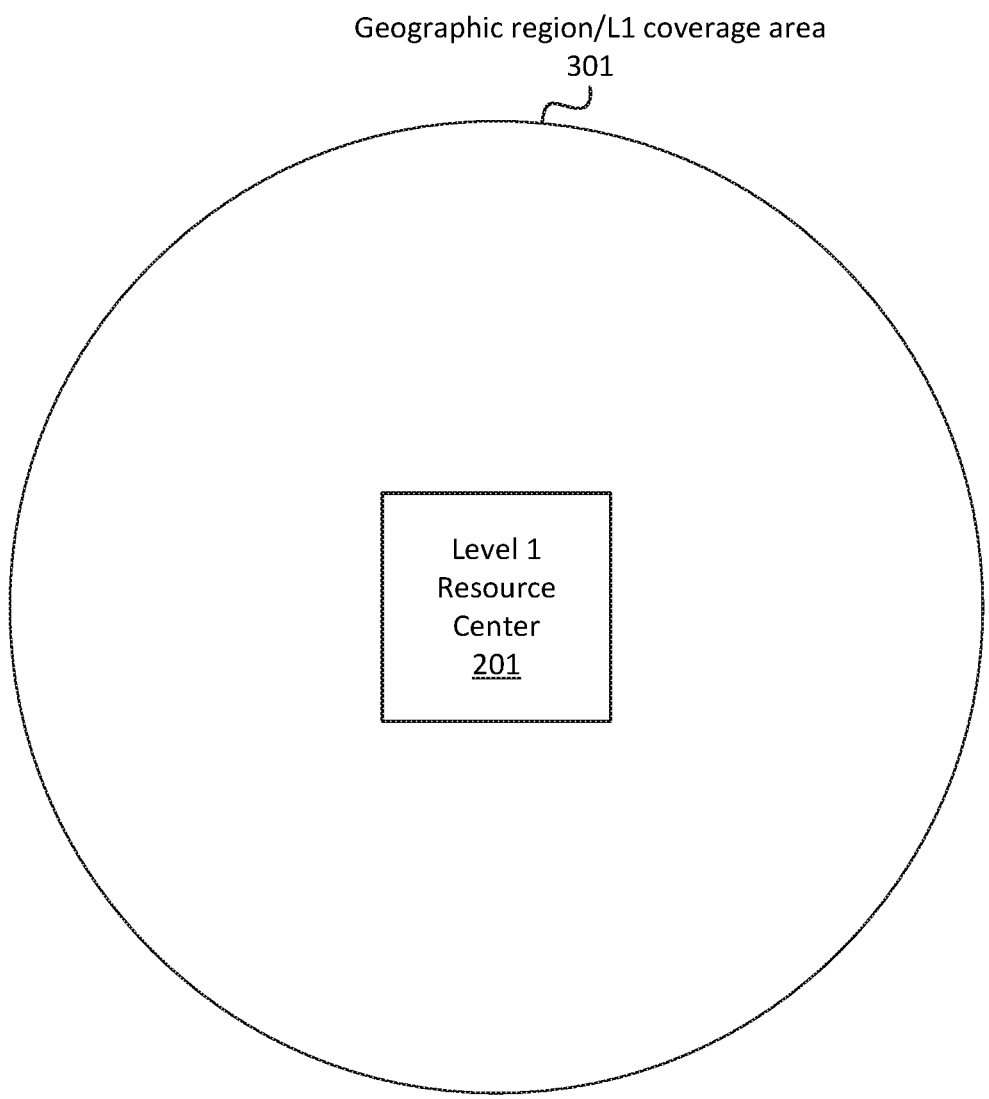
FIGS. 3-5 illustrate example arrangements of resource centers of the DRN, which correspond to different levels of a hierarchical deployment of the resource centers.
Figure 4:
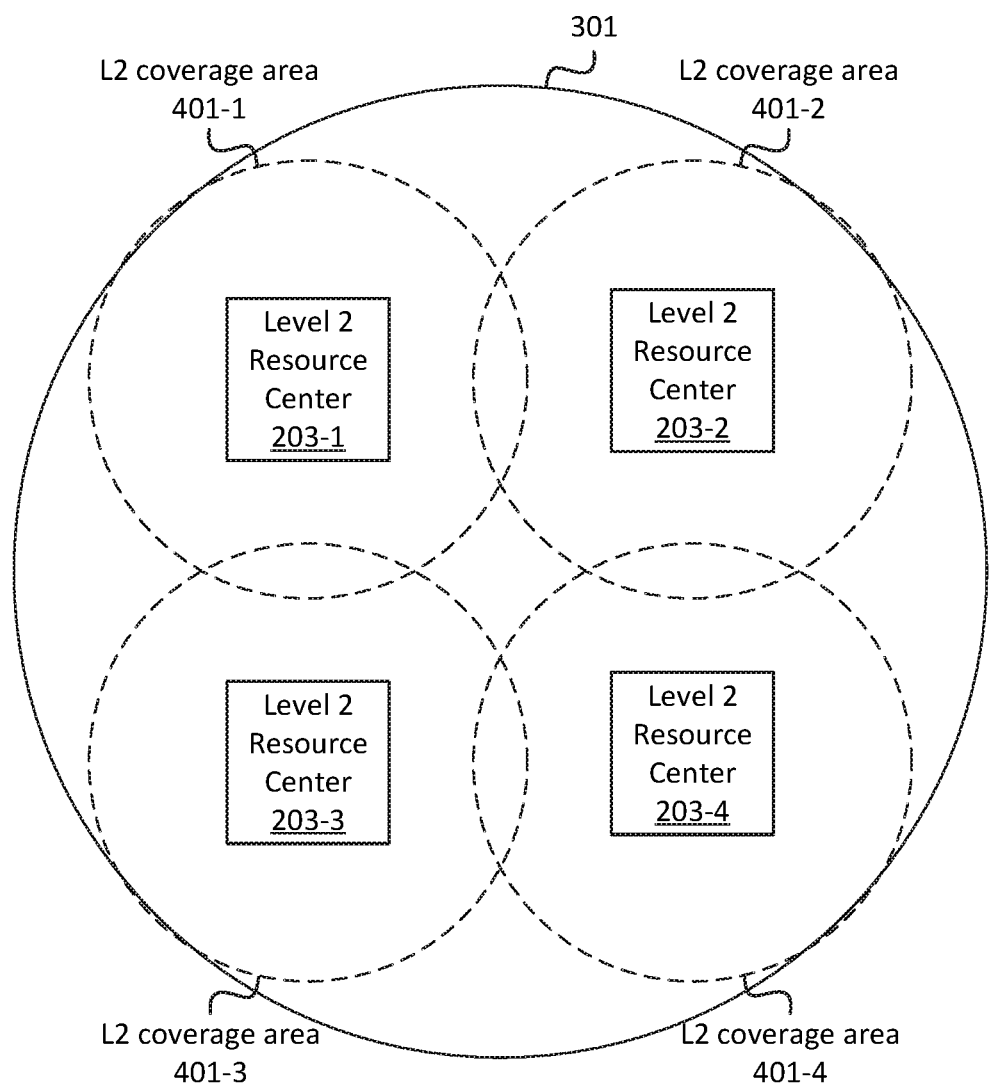
Figure 5:
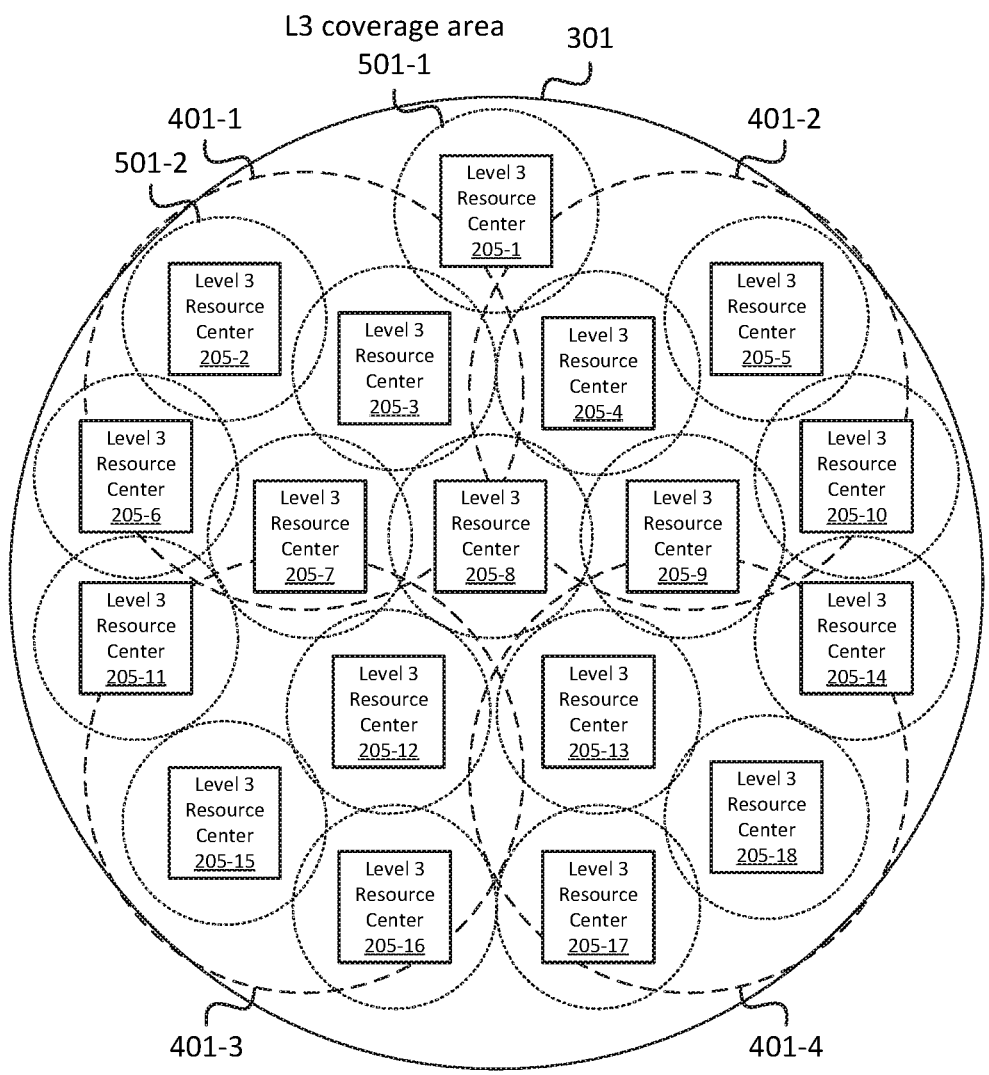

FIGS. 3-5 illustrate an example deployment of resource centers 201-205 in an example geographic region 301. As shown in FIG. 3, for example, Level 1 resource center 201 may be deployed within geographic region 301, and may also serve the entirety of geographic region 301. For example, traffic sent to or receive within geographic region 301 may be aggregated by or distribute by Level 1 resource center 201 (e.g., to one or more resource centers 203 and/or 205 located within geographic region 301).

For example, as shown in FIG. 4, four Level 2 resource centers 203-1, 203-2, 203-3, and 203-4 may be deployed within geographic region 301. Level 2 resource centers 203-1 through 203-4 may provide the same, or approximately the same, coverage area as Level 1 resource center 201 (e.g., may serve all or substantially all of geographic region 301). For example, coverage areas 401-1, 401-2, 401-3, and 401-4, associated with Level 2 resource centers 203-1, 203-2, 203-3, and 203-4, respectively, may cover most or all of geographic region 301. In practice, a different quantity of Level 2 resource centers 203 may be deployed, and/or may have different coverage areas than those shown in the example of FIG. 4.

As shown in FIG. 5, Level 3 resource centers 205-1 through 205-18 may be deployed within geographic region 301, and associated coverage areas 501 (only coverage areas 501-1 and 501-2 are referenced in FIG. 5, for the sake of clarity) may be associated with respective Level 3 resource centers. As with coverage areas 401, coverage areas 501 may cover most or all of geographic region 301. In practice, a different quantity of Level 3 resource centers 205 may be deployed, and/or may have different coverage areas than those shown in the example of FIG. 5.

Returning to FIG. 1, in some embodiments, the monitored information (at 102) may include parameters or characteristics of various resource centers associated with DRN 101. For example, such parameters or characteristics may include types of power available at the resource centers (e.g., alternating current ("AC"), direct current ("DC"), types or amounts of voltage available, types or amounts of current available, or the like), redundancy parameters (e.g., hardware redundancy, software redundancy, availability and/or quantity of "sister sites," or the like), coverage parameters (e.g., a geographical region that is served by the resource center), performance metrics (e.g., latency between the resource center and other network elements that communicate with the resource center), and/or other parameters or characteristics.

As noted above, DRAS 103 may monitor (at 102) such information associated with the configurable resources of DRN 101 on an ongoing basis. Further, the information may be received or determined on a granular basis, such that DRAS 103 is able to monitor information associated with each resource center of DRN 101.

As further shown, DRAS 103 may receive (at 104) a resource configuration request. For example, DRAS 103 may be associated with a portal, API, communication protocol, or the like, via which DRAS 103 may offer the ability to request resources of DRN 101 to be configured. DRAS 103 may receive the request from a device or system that communicates with DRAS 103 via such portal, API, etc. For example, DRAS 103 may receive the request from a workstation, a desktop computer, a tablet computer, and/or some other suitable device or system. While not discussed at length here, DRAS 103 may authenticate the request prior to performing further processing based on the request. For example, DRAS 103 may verify an identity of a device or system from which the request was received, may verify an identity of a user from whom the request was received, may verify secure content (e.g., a key, a hash value, etc.) included in or derived from the request, and/or may otherwise authenticate the request.

The resource configuration request may include parameters specifying an amount of resources requested. For example, the resource configuration request may specify an amount of processing resources (e.g., a type and/or quantity of processors and/or some other measure of processing power), an amount of memory resources, an amount of storage resources, an amount of network resources (e.g., a quantity of network interfaces, an amount of bandwidth, and/or some other measure of network resources), a type and/or quantity of particular hardware (e.g., a type and/or quantity of server racks), and/or some other indication of requested resources. The configuration request may also specify a desired coverage area, which may be expressed in terms of geographic coordinates, a radius or distance from a reference point, and/or some other suitable identifier(s) of geographic region(s). In some embodiments, the configuration request may specify performance or Quality of Service ("QoS")-related parameters, such as latency (e.g., a threshold maximum latency). In some embodiments, the configuration request may specify a type and/or amount of power needed for the requested resources (e.g., AC, DC, amount of voltage or current, etc.). In some embodiments, the resource configuration request may specify a type and/or amount of redundancy (e.g., software redundancy, hardware resources, quantity of "sister" sites, and/or other parameters relating to redundancy). In some embodiments, the resource configuration request may indicate a hierarchical level of a resource center at which to configure the resources (e.g., in embodiments where DRN 101 includes resource centers according to a defined hierarchy, as discussed further below). In some embodiments, the configuration request may include one or more other parameters in addition to, or in lieu of, the example parameters provided above.

In some embodiments, the resource configuration request may include an indication of preference or priority associated with one or more the parameters specified in the resource configuration request. For example, the resource configuration request may include a ranking of one or more the above parameters, a score or weight associated with each parameter (e.g., which may indicate a level of importance of the associated parameter), or some other suitable indicator of preference or priority.

Based on the monitoring (at 102) of the resources of DRN 101, and further based on the parameters indicated in the resource configuration request (at 104), DRAS 103 may identify (at 106) an optimal configuration of the resources of DRN 101. For example, DRAS 103 may identify one or more resource centers 201-205 to configure (e.g., at which to provision resources, install containers or virtual machines, etc.) based on the request. While more detailed examples are provided below, DRAS 103 may generally identify one or more resource centers 201-205 that serve a coverage area indicated in the resource configuration request and/or that meet other parameters indicated in the request. Further, DRAS 103 may identify (e.g., based on the monitoring at 102) which resource centers 103 have capacity (e.g., processing capacity, storage capacity, etc.) and meet one or more parameters or criteria specified in the resource configuration request.

In some embodiments, DRAS 103 may prioritize handling the resource configuration request by configuring resource centers of the highest possible level of the hierarchical arrangement while using the requested parameters as factors in selecting particular resource centers. For example, DRAS 103 may determine whether configuring a particular Level 1 resource center 201 will satisfy the request, and if not, DRAS 103 may determine whether configuring a set of Level 2 resource centers 203 will satisfy the request (and so on). For example, as noted above with respect to FIGS. 3-5, the same coverage area may be achieved with varying quantities of resource centers. Fewer resources may be consumed when configuring Level 1 resource center 201 than configuring multiple Level 2 or Level 3 resource centers having the same coverage area as Level 1 resource center 201. Thus, DRAS 103 may select Level 2 or Level 3 resource centers in situations where a Level 1 resource center is full (e.g., does not have adequate capacity), does not provide at least a threshold level of performance (e.g., latency) specified in the resource configuration request, and/or otherwise does not meet the parameters indicated in the resource configuration request.

In some embodiments, as noted above, the resource configuration request may include weights or priorities associated with particular parameters, based on which DRAS 103 may identify (at 106) an optimal configuration to satisfy the request. For example, some parameters may be indicated as relatively less important (or of zero importance or priority), while other parameters may be indicated as relatively more important (or as an absolute constraint that must be met).

Figure 6:
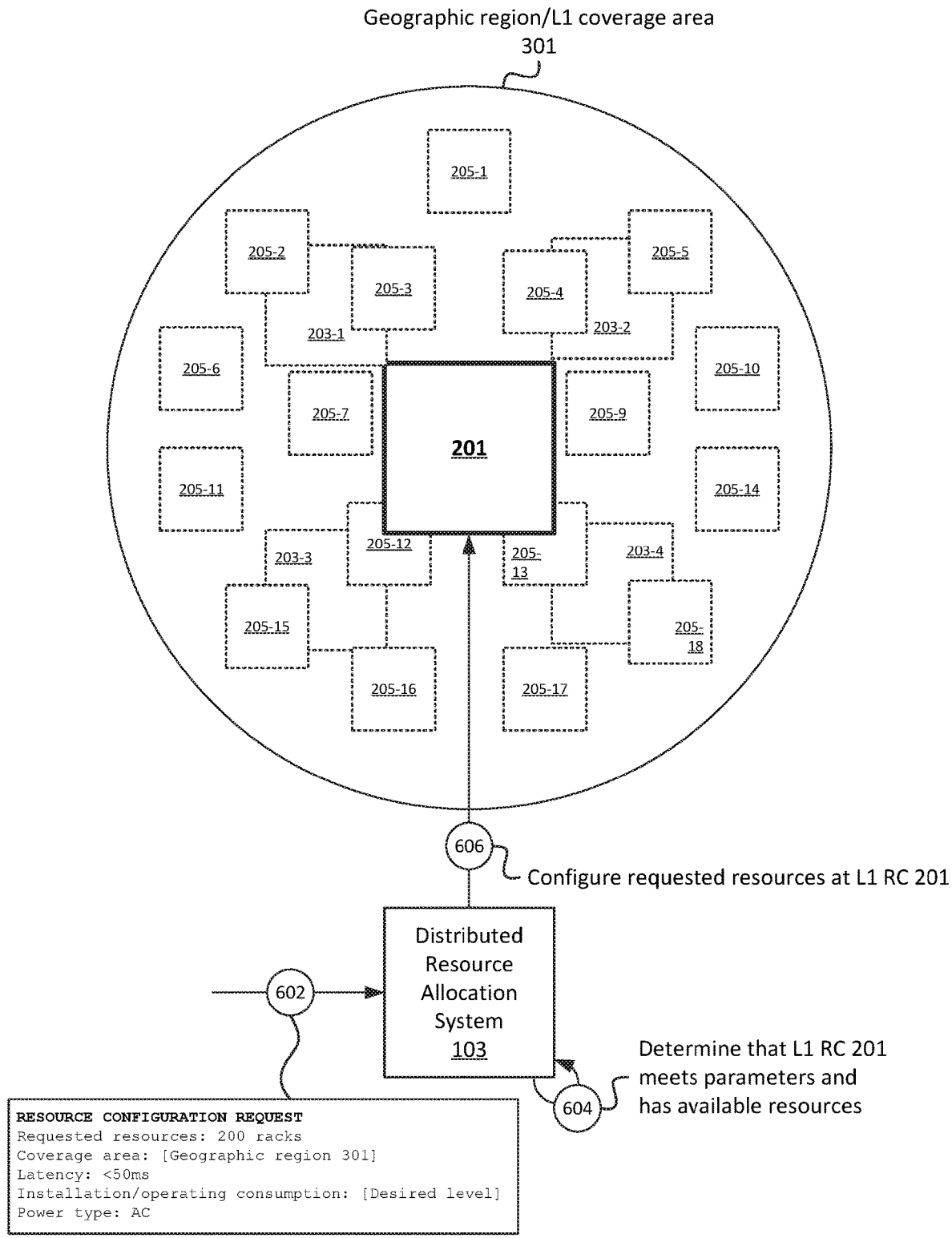
FIG. 6 illustrates an example scenario in which a particular resource center is selected for configuration based on parameters specified in a resource configuration request.
Figure 7:
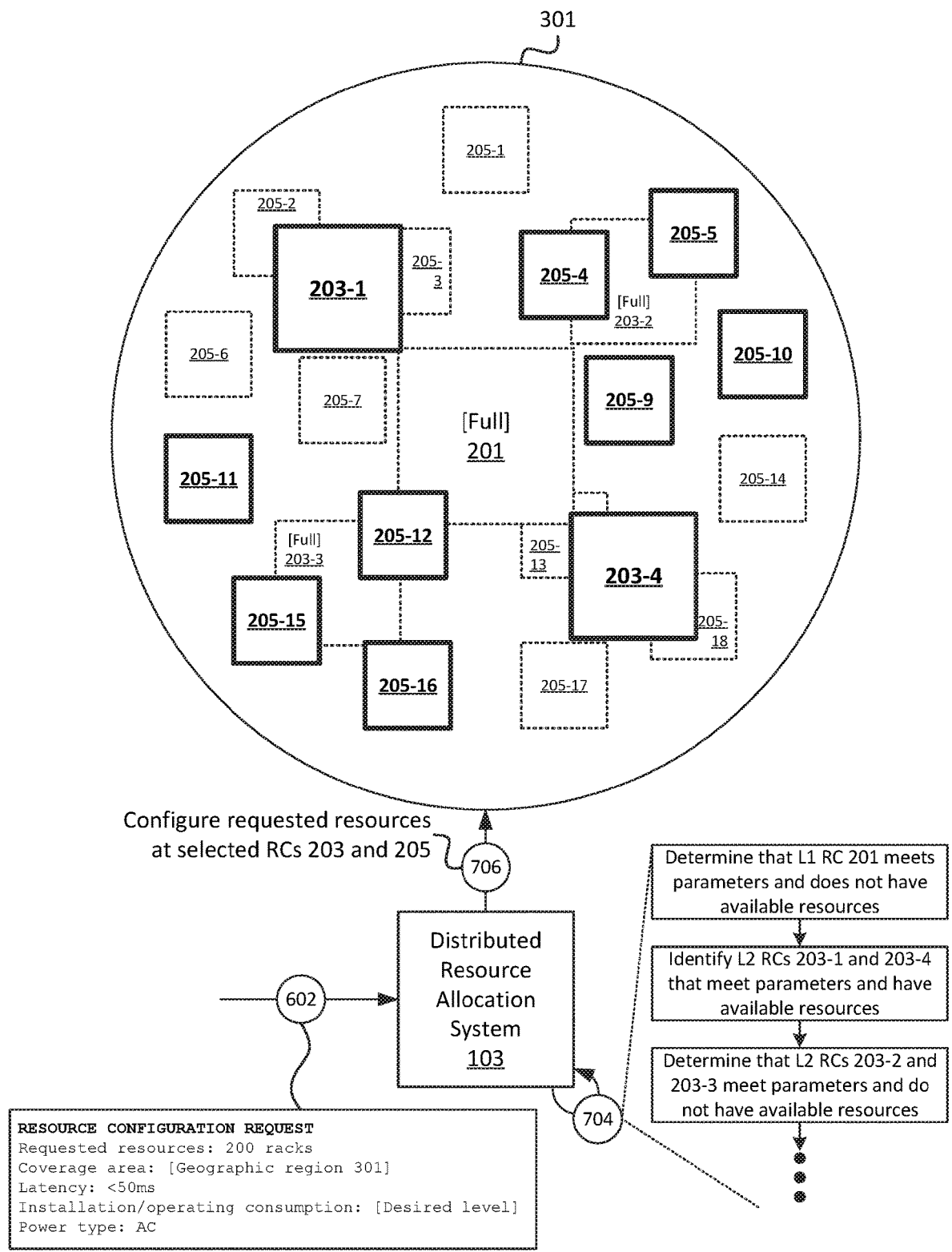
FIG. 7 illustrates an example scenario in which a set of resource centers, of a given level in a hierarchy, are selected for configuration based on one or more resource centers, of a different level in the hierarchy, not meeting one or more parameters specified in a resource configuration request.
Figure 8:
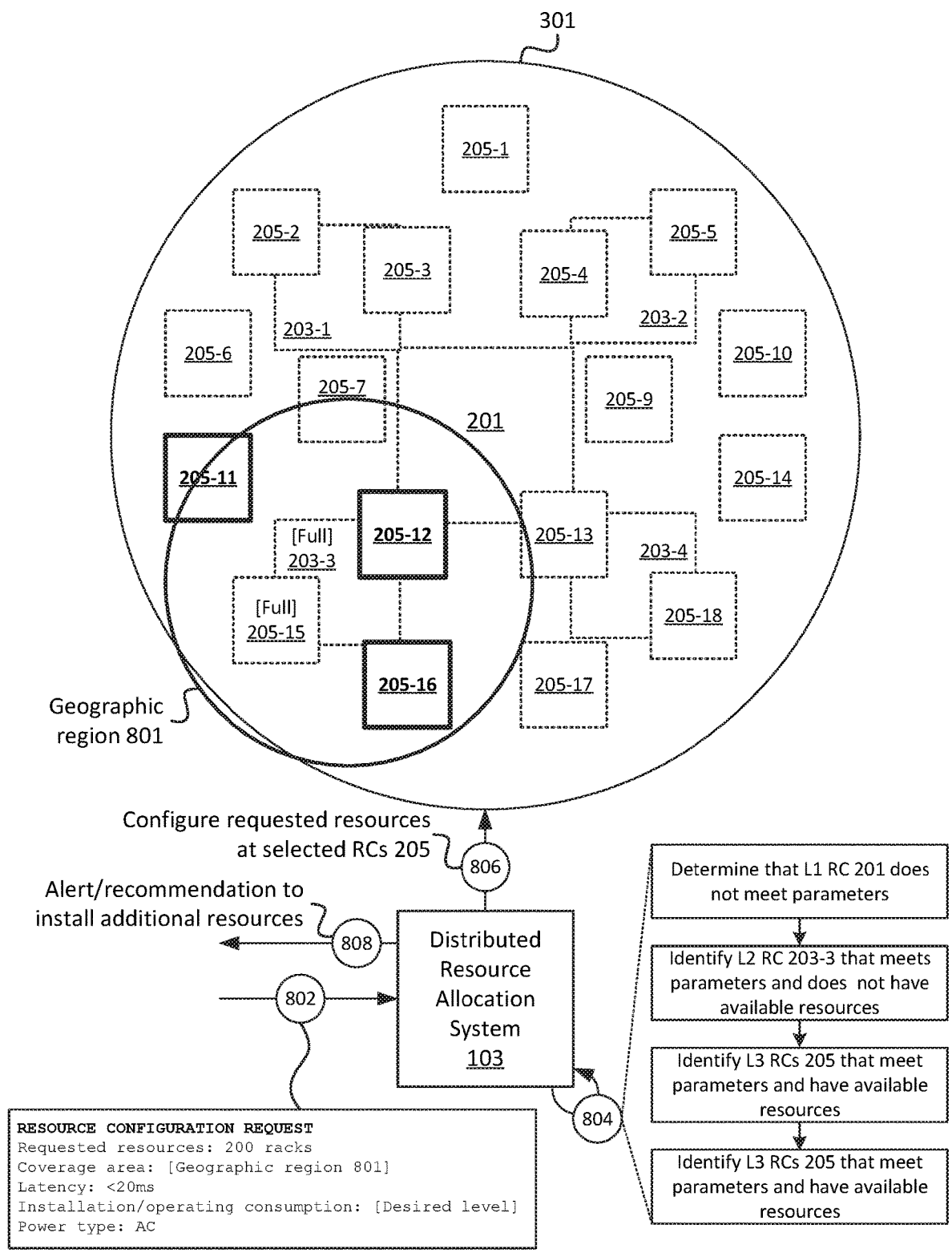
FIG. 8 illustrates an example scenario in which resource centers, located in a particular region specified in a resource configuration request, do not meet one or more parameters specified in the resource configuration request.

DRAS 103 may further determine how closely monitored parameters of resource centers of DRN 101 match the parameters specified in the request, and may identify (at 106) the optimal configuration based on how closely the monitored parameters of resource centers of DRN 101 match the parameters specified in the request. For example, if the resource configuration request specifies a maximum latency of 30 milliseconds ("ms") and a particular resource center of DRN 101 has a measured latency (e.g., as reported via the monitoring at 102) of 32 ms, DRAS 103 may determine that this particular resource center is a potential resource center to configure based on the request, while another resource center of DRN 101 that has a measured latency of 50 ms may be less likely to be selected (or not possible to be selected) by DRAS 103. FIGS. 6-8, described further below, provide examples of particular selections of resource centers of DRN 101 that may be made by DRAS 103 (e.g., at 106).

Once DRAS 103 has identified (at 106) an optimal configuration of configurable resources (e.g., resource centers) of DRN 101, DRAS 103 may configure (at 108) the resources of DRN 101 based on the identified optimal configuration. For example, DRAS 103 may instruct one or more identified resource centers to provision an amount of resources indicated in the request, and/or particular types of resources indicated in the request. Additionally, or alternatively, DRAS 103 may instruct one or more devices or systems that serve as an interface or controller between DRAS 103 and the resources of DRN 101, which may in turn cause the identified resources to be provisioned in DRN 101.

As mentioned above, FIGS. 6-8 provide examples of particular selections of resource centers of DRN 101 that may be made by DRAS 103 (e.g., at 106). The examples of FIGS. 6-8 refer to the example arrangement of resource centers 201-205, deployed throughout geographic region 301, discussed above with respect to FIGS. 3-5.

As shown in FIG. 6, for example, DRAS 103 may receive (at 602) a resource configuration request. As discussed above, DRAS 103 may receive this request from an authorized source, such as a workstation, administrator portal, etc.

In this example, the resource configuration request may indicate a request for a particular quantity of resources. In FIG. 6, the quantity of resources are referred to as "200 racks" for the sake of simplicity. In practice, as discussed above, the request may indicate an amount of resources, types of resources, etc. The terminology "200 racks," as used herein, may refer to 200 of a particular type of resource (e.g., a "server rack") that has predetermined or static parameters.

The resource configuration request (received at 602) may further indicate a desired coverage area for which the resources should be available. In this example, the desired coverage area may be geographic region 301. For example, the resource configuration request may include an identifier of geographic region 301 (e.g., "Region_A"), based on which DRAS 103 may perform a lookup or other operation to determine particular geographic coordinates associated with the requested coverage area. Additionally, or alternatively, the resource configuration request may include sets of geographic coordinates and/or other suitable identifiers of the requested coverage area.

The resource configuration request may further specify a maximum latency of 50 ms, a desired level of installation and/or operating resource consumption (e.g., power consumption, capital expense of resources used to satisfy the request, operating expenses of resources used to satisfy the request, and/or other consumption-related metrics), a particular type of power (e.g., AC power in this example), and/or other parameters (e.g., redundancy type or amount). As discussed above, the resource configuration request may further include weights, scores, etc. associated with one or more of the requested parameters, based on which DRAS 103 may determine one or more resource centers to satisfy the request. Such weights, scores, etc. are not discussed at length in this example.

In some embodiments, the resource configuration request may be a request to provision resources and provide an identifier based on which the provisioned resources may be accessed (e.g., by a requestor associated with DRAS 103). In some embodiments, the resource configuration may include one or more containers, virtual machines, etc., to be installed or instantiated on the requested resources.

As further shown, DRAS 103 may determine (at 604) that Level 1 resource center 201 meets the requested parameters, and has resources available to accommodate the requested resources. For example, DRAS 103 may determine, based on monitoring resources associated with resource centers 201-205, that Level 1 resource center 201 has 200 racks available, serves the desired geographic region 301, meets or exceeds the latency threshold of 50 ms, meets the specified level of installation or operating consumption, and provides AC power. Based on this determination, DRAS 103 may configure (at 606) Level 1 resource center 201 based on the request. For example, DRAS 103 may instruct Level 1 resource center 201 to allocate 200 racks' worth of resources, and may provide one or more identifiers of the allocated resources to a requestor associated with the resource configuration request. Additionally, or alternatively, Level 1 resource center 201 may provide one or more containers, virtual machines, etc. to Level 1 resource center 201 for installation or instantiation on Level 1 resource center 201.

FIG. 7 illustrates an example of DRAS 103 receiving (at 602) a resource configuration request with the same parameters as discussed above with respect to FIG. 6, but in a situation where Level 1 resource center 201 is unable to accommodate the quantity of resources. For example, as shown, Level 1 resource center 201 may be "full," in that DRAS 103 may determine (e.g., based on monitoring resources of Level 1 resource center 201) that Level 1 resource center 201 does not have the requested 200 racks' worth of resources.

As discussed above, DRAS 103 may first evaluate Level 1 resource center 201 to satisfy the resource configuration request, as configuring Level 1 resource center 201 would provide the requested coverage area while also utilizing the fewest overall resources. In this example, since DRAS 103 determines that Level 1 resource center 201 does not have available resources (even if all other parameters are met), Level 1 resource center 201 may next evaluate Level 2 resource centers 203 as candidates for configuration. For example, Level 1 resource center 201 may determine a geographically distributed set of Level 2 resource centers 203 to which the requested 200 racks may be deployed. The distributed deployment of these racks (e.g., at multiple Level 2 resource center 203) may be result in reduced or otherwise less optimal utilization of the 200 racks than a more central deployment (e.g., at a single Level 1 resource center 201).

In this example, DRAS 103 may identify (at 704) that Level 2 resource centers 203-1 and 203-4 meet the parameters specified in the resource configuration request (e.g., provide the requested coverage area), and may further determine that Level 2 resource centers 203-2 and 203-3 do not have available resources. Assuming that configuring the requested resources at Level 2 resource centers 203-1 through 203-4 would satisfy the request (e.g., configure 200 racks to serve geographic region 301), the lack of available resources at resource centers 203-2 and 203-3 may necessitate the evaluation of the next level of resource centers (e.g., Level 3 resource centers 205, in this example).

For example, as shown, DRAS 103 may identify Level 3 resource centers 205-4, 205-5, 205-9, and 205-10 as having coverage areas that cover the coverage area otherwise provided by Level 2 resource center 203-2, and may identify Level 3 resource centers 205-11, 205-12, 205-15, and 205-16 as having coverage areas that cover the coverage area otherwise provided by Level 2 resource center 203-3. Further assume, for this example, that these identified Level 3 resource centers 205 have available capacity to satisfy the request, and that provisioning the resources at the identified Level 3 resource centers 205 (in addition to the identified Level 2 resource centers) satisfies the parameters indicated in the request. That is, DRAS 103 may determine that configuring the requested resources (e.g., 200 racks) at each one of Level 2 resource centers 203-1 and 203-4, as well as at Level 3 resource centers 205-4, 205-5, 205-9, 205-10, 205-11, 205-12, 205-15, and 205-16, satisfies the parameters indicated in the request. For example, as discussed above, the request may specify a maximum installation and/or operating consumption, which may refer to an overall measure of consumption. This overall measure of consumption may be compared to the overall consumption that is, or would be, consumed by configuring the resources at all of the identified Level 2 and Level 3 resource centers.

Accordingly, DRAS 103 may configure (at 706) the requested resources (e.g., 200 racks) across Level 2 resource centers 203-1 and 203-4, and Level 3 resource centers 205-4, 205-5, 205-9, 205-10, 205-11, 205-12, 205-15, and 205-16. In FIG. 7, the selected resource centers are shown with bold black lines, while the unselected resource centers are shown with dashed lines.

FIG. 8 illustrates another example of some embodiments, in which DRAS 103 may receive (at 802) a resource configuration request. In this example, the resource configuration request may include the same parameters as the resource configuration request (received at 602 in FIGS. 6 and 7), except that the coverage area specified in this resource configuration request may specify geographic region 801 and the maximum latency may be specified as 20 ms.

Assume, for this example, that Level 1 resource center 201 has available capacity, but does not satisfy the maximum latency (e.g., is greater than 20 ms, and/or is greater than 20 ms by at least a threshold amount). Thus, while Level 1 resource center 201 would satisfy the coverage area specified in the request and further has resources available to satisfy the request, the latency associated with Level 1 resource center 201 (e.g., as determined based on monitoring parameters or metrics associated with Level 1 resource center 201) may cause DRAS 103 to refrain from selecting Level 1 resource center 201 for configuration based on the request. DRAS 103 may then evaluate the next level down in the hierarchy (e.g., Level 2 resource centers 203).

DRAS 103 may determine that Level 2 resource centers 203-1, 203-2, and 203-4 do not satisfy the requested coverage area (e.g., geographic region 801), and therefore are not candidates for configuration based on the request. Further DRAS 103 may determine that Level 2 resource center 203-3 satisfies the coverage area. However, in this example, DRAS 103 may determine (at 804) that Level 2 resource center 203-3 is full (e.g., does not have available capacity to provision the requested resources). Accordingly, DRAS 103 may evaluate Level 3 resources 205 that provide coverage sufficient to cover the requested coverage area (e.g., geographic region 801).

In this example, Level 3 resource centers 205-11, 205-12, 205-15, and 205-16 may, together, serve the requested geographic region 801. In this example, DRAS 103 may determine that Level 3 resource centers 205-11, 205-12, and 205-16 have the requested resources available, but may determine that Level 3 resource center 205-15 does not have the requested resources. In some embodiments, DRAS 103 may configure (at 806) the requested resources at Level 3 resource centers 205-11, 205-12, and 205-16. As configuring these three Level 3 resource centers 205 may not satisfy the requested coverage area (e.g., geographic region 801), DRAS 103 may further output (at 808) an alert that one or more of the requested parameters were not satisfied. For example, DRAS 103 may output the alert to a device or system from which the request (at 802) was received, and/or to an administrator associated with DRN 101. In some embodiments, the recommendation (output at 808) may include a recommendation to install additional configurable resources (e.g., at a facility in which Level 3 resource center 205-15 is located, at a location that is proximate to a location of Level 3 resource center 205-15, or at a location that would provide a coverage area that corresponds to a coverage area associated with Level 3 resource center 205-15).

In some embodiments, the alert may include an indication of a coverage area that corresponds to the resource centers that were provisioned based on the request (e.g., an indication of coverage areas associated with Level 3 resource centers 205-11, 205-12, and 205-16). In this manner, a requestor of the configuration of the resources may be informed of what portions of the requested coverage area (e.g., geographic region 801) are served by the provisioning of Level 3 resource centers 205-11, 205-12, and 205-16, which may be less than the requested coverage area.

In some embodiments, the alert may indicate reasons why the request was not fully satisfied. In this example, the alert may indicate that provisioning resources at Level 3 resource center 205-15, if such resources were available, would have satisfied the request. In some embodiments, DRAS 103 may further determine request parameters which, if modified, would satisfy other aspects of the request. For example, DRAS 103 may determine that if the latency parameter were changed to a 50 ms maximum latency, that configuring the resources at Level 1 resource center 201 would satisfy the request. DRAS 103 may, in some embodiments, include such information in the alert (output at 808). In some embodiments, the alert may include an option to cancel or modify the request (e.g., when some or all of the request could not be satisfied). In this example, the alert may include an option to revert or cancel the provisioning of resources at Level 3 resource centers 205-11, 205-12, and 205-16. Additionally, or alternatively, the alert may include an option to provision the requested resources at Level 1 resource center 201 (e.g., to satisfy the requested coverage area, with a modification to the requested maximum latency, as discussed above).

Figure 9:
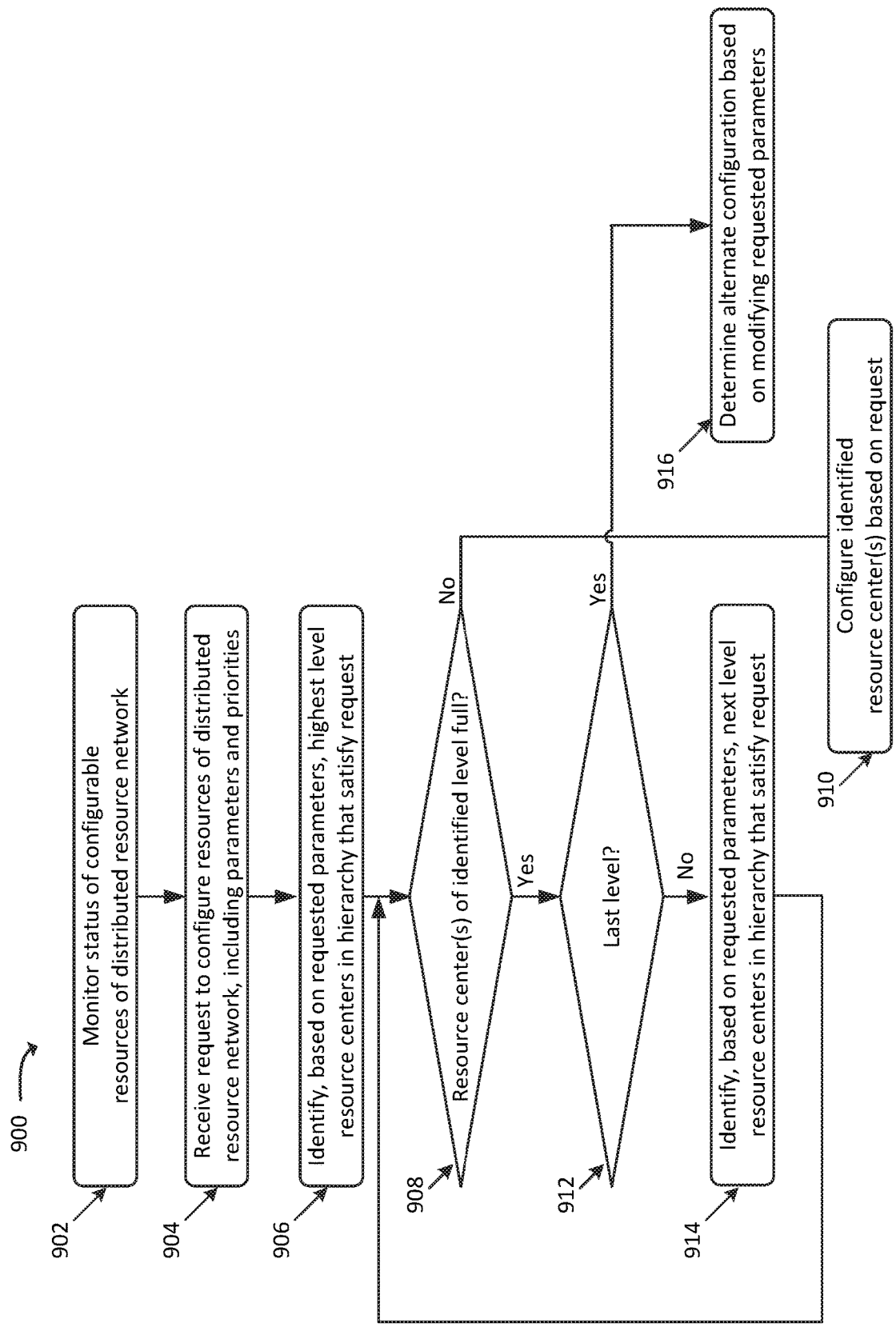
FIG. 9 illustrates an example process for configuring resources of a DRN based on a resource configuration request.

FIG. 9 illustrates an example process 900 for configuring resources of a DRN based on a resource configuration request. In some embodiments, some or all of process 900 may be performed by DRAS 103. In some embodiments, one or more other devices may perform some or all of process 900 in concert with, and/or in lieu of, DRAS 103.

As shown, process 900 may include monitoring (at 902) the status of configurable resources of DRN 101. For example, as discussed above, DRAS 103 may receive status information from configurable resources of DRN 101 (e.g., resource centers, which may sometimes be referred to as "data centers"). In some embodiments, DRAS 103 may receive status information from a controller or other device or system that serves as an interface or status reporting system on behalf of DRN 101 or configurable resources of DRN 101. As discussed above, the status information may include parameters or characteristics of resource centers of DRN 101, such as types or amounts of resources that are available, capacity and/or load information, or other suitable information.

Process 900 may further include receiving (at 904) a request to configure resources of DRN 101, including parameters of the request. As discussed above, the request may further specify priorities, scores, constraints, etc. associated with the parameters. For example, the request may specify a coverage area, performance thresholds (e.g., QoS requirements, Service Level Agreements ("SLAs"), or the like), types and/or amounts of resources requested, and/or other parameters. In some embodiments, the request may include constraints, priorities, weights, etc. that may indicate, generally, how important a given parameter is. As discussed above, such constraints, priorities, weights, etc. may be used in the identification of a suitable set of configurable resources of DRN 101 to satisfy the request.

Process 900 may additionally include identifying (at 906), based on the requested parameters, resource centers of a highest level in a hierarchical arrangement of resource centers of DRN 101 that satisfy the request. For example, as discussed above, DRAS 103 may attempt to configure resource centers of the highest possible level to satisfy parameters of the request (e.g., coverage area, latency, etc.), in order to consume the fewest resources of DRN 101.

Process 900 may also include determining (at 908) whether resource centers of the identified level are full. For example, DRAS 103 may determine (e.g., based on the monitoring at 902) whether resource centers of the identified level (e.g., resource centers that satisfy the requested coverage area) have available capacity to provision the requested resources. If the resource centers of the identified level are not full (at 908—NO), then process 900 may further include configuring (at 910) the identified resource center(s) based on the request. As discussed above, in situations where resource centers of the identified level are able to cover portions of the requested coverage area (but not the entire coverage area, such as situations where some identified resource centers in the requested coverage area are full while others have available capacity), DRAS 103 may configure (at 910) such resource centers, while continuing to evaluate resource centers of the next level (e.g., as discussed below) in order to cover the coverage area that was not covered by the configured resource centers of the current level.

If, on the other hand, the resource centers of the identified level are full (at 908—YES), then process 900 may further include determining (at 912) whether the identified level is a last level in the hierarchical arrangement of DRN 101. For example, in an example hierarchical arrangement with three levels (Level 1 being the highest level and Level 3 being the lowest), DRAS 103 may determine whether the identified (at 906) level was Level 3.

If the identified level is not the last level (at 912—NO), then process 900 may also include identifying (at 914), based on the requested parameters, resource centers of the next level of the hierarchical arrangement that satisfy the request. As shown, once the resource centers of the next level of the hierarchical arrangement has been identified, DRAS 103 may determine (at 908) whether these resource centers are full, and continue to configure (at 910) these resource centers if available, or continue to evaluate the next level in the hierarchy. In this manner, DRAS 103 may iteratively repeat portions of process 900 in order to efficiently provision resources of DRN 101 based on the request.

If the identified level is the last level (at 912—YES), then process 900 may further include determining (at 916) an alternate configuration based on the modifying the requested parameters. For example, as discussed above, DRAS 103 may simulate the modification of one or more of the requested parameters and identify one or more resource centers based on the simulated modified one or more requested parameters. In some embodiments, when simulating the modification of the requested parameters, DRAS 103 may take into account the constraints, priorities, etc. indicated in the request. For example, if a given parameter is indicated as an absolute constraint, DRAS 103 may avoid simulating the modification of the given parameter. If, on the other hand, a given parameter is indicated as optional (e.g., a low or zero weight or priority), DRAS 103 may simulate the modification of this parameter.

For example, DRAS 103 may perform (or re-perform) some or all of the operations of process 900 based on the simulated modified parameters. If DRAS 103 is able to identify an alternate configuration based on the simulated modified parameters, DRAS 103 may, in some embodiments, notify a device or system from which the request was received (at 904) of the alternate configuration. For example, DRAS 103 may request confirmation to configure resources of DRN 101 based on the modified parameters (e.g., in lieu of based on the original parameters of the request). In some embodiments, DRAS 103 may simulate the creation or installation of additional resources in DRN 101 (e.g., the construction of additional facilities, the installation of hardware or other resources in existing facilities, or the like), and may notify the requestor and/or some other entity that the request would be fulfilled if such additional resources were installed in DRN 101.

Figure 10:
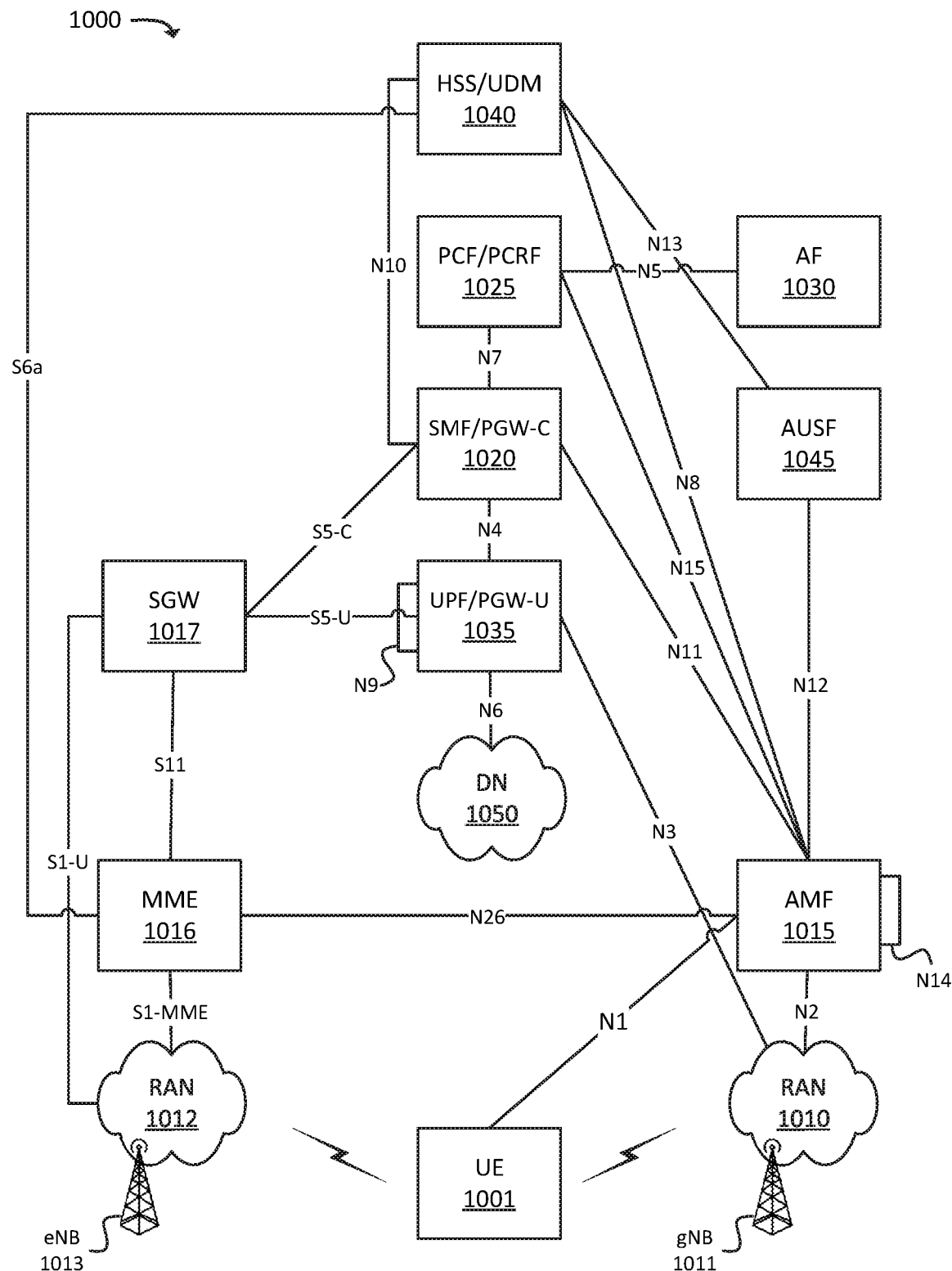
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation 5G network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 1001, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050. Although not explicitly depicted here, some or all of the elements of environment 1000 may include, may be communicatively coupled to, and/or may implement DRN 101.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1001 may include a computation and communication device, such as a wireless mobile communication device that is capable of communicating with RAN 1010, RAN 1012, and/or DN 1050. UE 1001 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1001 may send traffic to and/or receive traffic (e.g., user plane traffic) from DN 1050 via RAN 1010, RAN 1012, and/or and UPF/PGW-U 1035.

RAN 1010 may be, or may include, a 5G RAN that includes one or more base stations (e.g., one or more gNBs 1011), via which UE 1001 may communicate with one or more other elements of environment 1000. UE 1001 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, AMF 1015, and/or one or more other devices or networks) and may communicate the traffic to UE 1001 via the air interface.

RAN 1012 may be, or may include, an LTE RAN that includes one or more base stations (e.g., one or more eNBs 1013), via which UE 1001 may communicate with one or more other elements of environment 1000. UE 1001 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, SGW 1017, and/or one or more other devices or networks) and may communicate the traffic to UE 1001 via the air interface.

AMF 1015 may include one or more devices, systems, VNFs, etc., that perform operations to register UE 1001 with the 5G network, to establish bearer channels associated with a session with UE 1001, to hand off UE 1001 from the 5G network to another network, to hand off UE 1001 from the other network to the 5G network, manage mobility of UE 1001 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1001 with the EPC, to establish bearer channels associated with a session with UE 1001, to hand off UE 1001 from the EPC to another network, to hand off UE 1001 from another network to the EPC, manage mobility of UE 1001 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1001. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1001, from DN 1050, and may forward the user plane data toward UE 1001 (e.g., via RAN 1010, SMF/PGW-C 1020, and/or one or more other devices). In some embodiments, multiple UPFs 1035 may be deployed (e.g., in different geographical locations), and the delivery of content to UE 1001 may be coordinated via the N9 interface (e.g., as denoted in FIG. 10 by the line marked "N9" originating and terminating at UPF/PGW-U 1035). Similarly, UPF/PGW-U 1035 may receive traffic from UE 1001 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1001.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1001 may communicate, through DN 1050, with data servers, other UEs 1001, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1001 may communicate.

Figure 11:
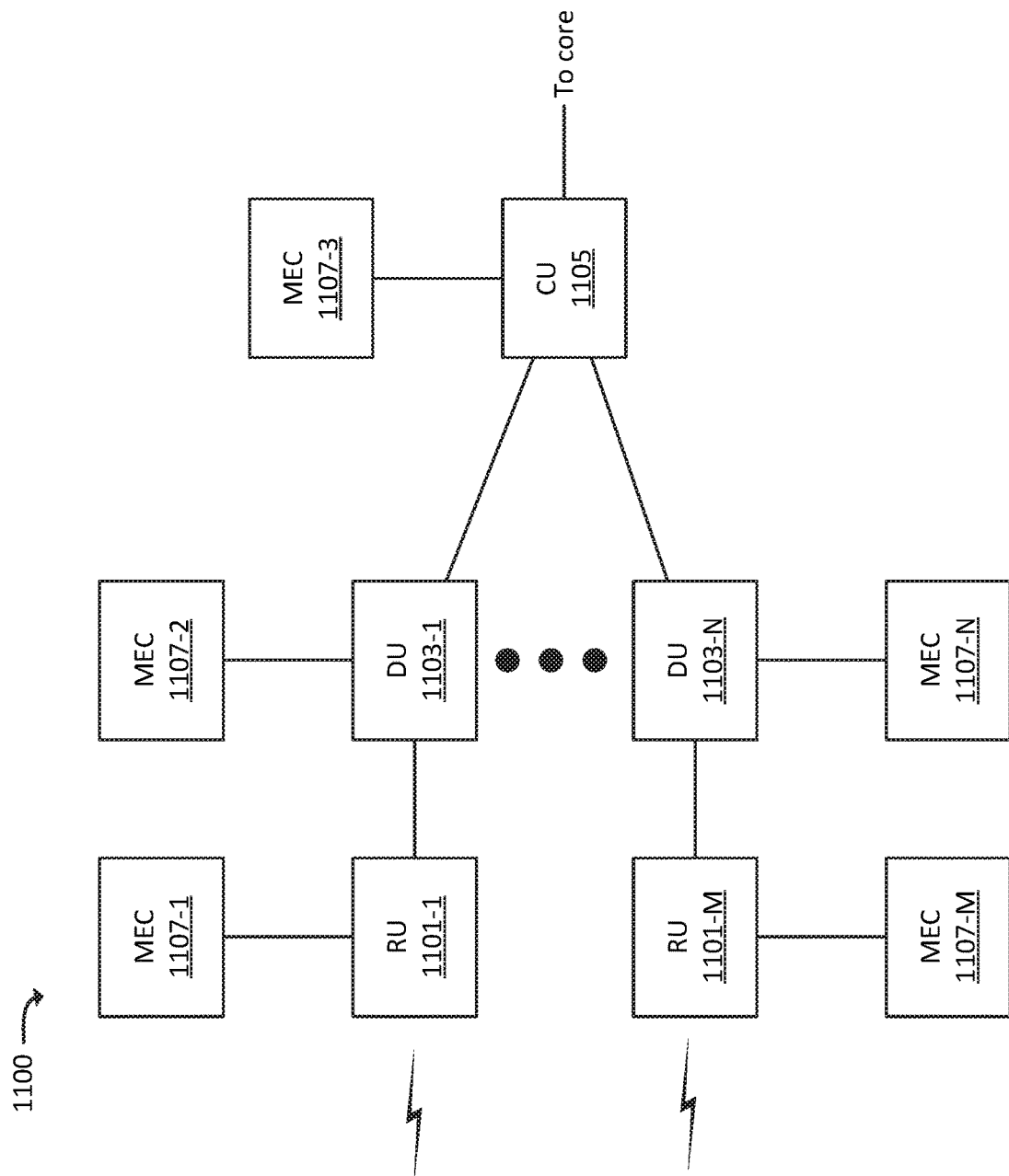
FIG. 11 illustrates an example arrangement of a radio access network ("RAN"), in accordance with some embodiments.

FIG. 11 illustrates an example Distributed Unit ("DU") network 1100, which may be included in and/or implemented by one or more RANs (e.g., RAN 1010). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Remote Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 1001 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1001, and may determine which DU(s) 1103 should receive the downlink traffic. DU 1103 may include one or more devices that transmit traffic between a core network (e.g., via CU 1105) and UE 1001 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1001.

RU 1101 may include hardware circuitry (e.g., one or more RF transceivers, antennas, radios, and/or other suitable hardware) to communicate wirelessly (e.g., via an RF interface) with one or more UEs 1001, one or more other DUs 1103 (e.g., via RUs 1101 associated with DUs 1103), and/or any other suitable type of device. In the uplink direction, RU 1101 may receive traffic from UE 1001 and/or another DU 1103 via the RF interface and may provide the traffic to DU 1103. In the downlink direction, RU 1101 may receive traffic from DU 1103, and may provide the traffic to UE 1001 and/or another DU 1103.

RUs 1101 may, in some embodiments, be communicatively coupled to one or more MECs 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 1001, via a respective RU 1101.

For example, RU 1101-1 may route some traffic, from UE 1001, to MEC 1107-1 instead of to a core network (e.g., via DU 1103 and CU 1105). MEC 1107-1 may process the traffic, perform one or more computations based on the received traffic, and may provide traffic to UE 1001 via RU 1101-1. In this manner, ultra-low latency services may be provided to UE 1001, as traffic does not need to traverse DU 1103, CU 1105, and an intervening backhaul network between DU network 1100 and the core network. In some embodiments, MECs 1107 may include, and/or may be implemented by, resource centers of DRN 101.

Figure 12:
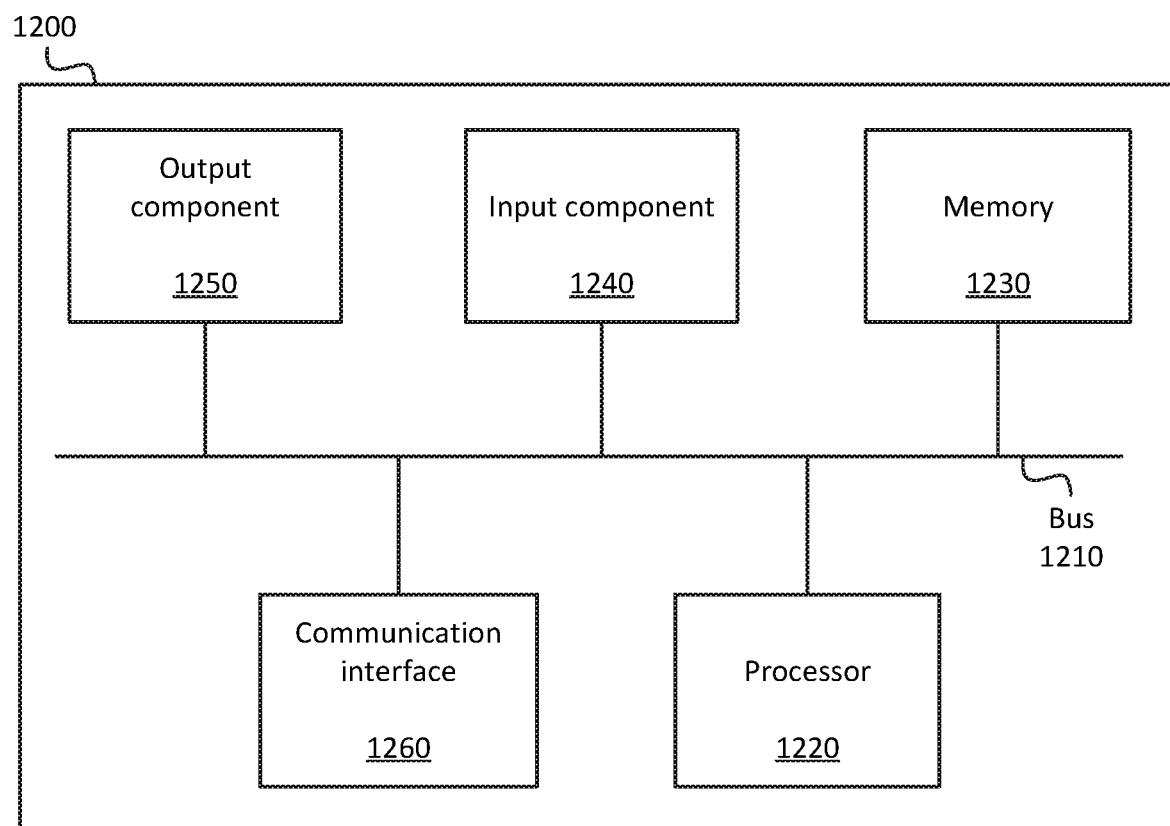
FIG. 12 illustrates example functional components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1 and 6-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a request to configure resources of a distributed resource network that includes a hierarchical arrangement of resource centers, wherein the hierarchical arrangement includes at least:
a first set of resource centers at a first level of the hierarchical arrangement, and
a second set of resource centers at a second level of the hierarchical arrangement;
determine that at least some of the request cannot be satisfied by configuring resource centers of only the first set of resource centers;
based on determining that at least some of the request cannot be satisfied by configuring resource centers of only the first set of resource centers, identify one or more resource centers of the second set of resource centers to satisfy the request; and
configure the one or more resource centers of the second set of resource centers to satisfy at least the portion of the request that cannot be satisfied by configuring resource centers of only the first set of resource centers.

2. The device of claim 1, wherein the request specifies a coverage area, wherein identifying the one or more resource centers of the second set of resource centers includes identifying one or more resource centers of the second set of resource centers that serve at least a portion of the specified coverage area.

3. The device of claim 1, wherein the first set of resource centers include a particular resource center that serves a particular coverage area, and wherein the second set of resource centers include a plurality of resource centers that, together, serve at least one of:
the particular coverage area, or
a subset of the particular coverage area.

4. The device of claim 3, wherein the particular resource center is associated with a particular measure of latency, and wherein the plurality of resource centers of the second set of resource centers are each associated with a respective measure of latency that is lower than the particular measure of latency.

5. The device of claim 1, wherein the request specifies a quantity of requested resources, and wherein configuring the one or more resource centers of the second set of resource centers includes provisioning the specified quantity of resources at the one or more resource centers of the second set of resource centers.

6. The device of claim 1, wherein the one or more processors are further configured to:
configure one or more resource centers of the first set of resource centers to satisfy at least another portion of the request, wherein the configuration of the one or more resource centers of the first set of resource centers and the one or more resource centers of the second set of resource centers fully satisfies the request.

7. The device of claim 1, wherein a particular resource center, of the first set of resource centers, serves as an aggregator for traffic received via a plurality of resource centers of the second set of resource centers.

8. A non-transitory computer-readable medium, storing a plurality of processor-executable instructions to:
receive a request to configure resources of a distributed resource network that includes a hierarchical arrangement of resource centers, wherein the hierarchical arrangement includes at least:
a first set of resource centers at a first level of the hierarchical arrangement, and
a second set of resource centers at a second level of the hierarchical arrangement;
determine that at least some of the request cannot be satisfied by configuring resource centers of only the first set of resource centers;
based on determining that at least some of the request cannot be satisfied by configuring resource centers of only the first set of resource centers, identify one or more resource centers of the second set of resource centers to satisfy the request; and
configure the one or more resource centers of the second set of resource centers to satisfy at least the portion of the request that cannot be satisfied by configuring resource centers of only the first set of resource centers.

9. The non-transitory computer-readable medium of claim 8, wherein the request specifies a coverage area, wherein identifying the one or more resource centers of the second set of resource centers includes identifying one or more resource centers of the second set of resource centers that serve at least a portion of the specified coverage area.

10. The non-transitory computer-readable medium of claim 8, wherein the first set of resource centers include a particular resource center that serves a particular coverage area, and wherein the second set of resource centers include a plurality of resource centers that, together, serve at least one of:
the particular coverage area, or
a subset of the particular coverage area.

11. The non-transitory computer-readable medium of claim 10 wherein the particular resource center is associated with a particular measure of latency, and wherein the plurality of resource centers of the second set of resource centers are each associated with a respective measure of latency that is lower than the particular measure of latency.

12. The non-transitory computer-readable medium of claim 8, wherein the request specifies a quantity of requested resources, and wherein configuring the one or more resource centers of the second set of resource centers includes provisioning the specified quantity of resources at the one or more resource centers of the second set of resource centers.

13. The non-transitory computer-readable medium of claim 8, wherein the plurality of processor-executable instructions further include processor-executable instructions to:
configure one or more resource centers of the first set of resource centers to satisfy at least another portion of the request, wherein the configuration of the one or more resource centers of the first set of resource centers and the one or more resource centers of the second set of resource centers fully satisfies the request.

14. The non-transitory computer-readable medium of claim 8, wherein a particular resource center, of the first set of resource centers, serves as an aggregator for traffic received via a plurality of resource centers of the second set of resource centers.

15. A method, comprising:
receiving a request to configure resources of a distributed resource network that includes a hierarchical arrangement of resource centers, wherein the hierarchical arrangement includes at least:
a first set of resource centers at a first level of the hierarchical arrangement, and
a second set of resource centers at a second level of the hierarchical arrangement;
determining that at least some of the request cannot be satisfied by configuring resource centers of only the first set of resource centers;
based on determining that at least some of the request cannot be satisfied by configuring resource centers of only the first set of resource centers, identifying one or more resource centers of the second set of resource centers to satisfy the request; and
configuring the one or more resource centers of the second set of resource centers to satisfy at least the portion of the request that cannot be satisfied by configuring resource centers of only the first set of resource centers.

16. The method of claim 15, wherein the request specifies a coverage area, wherein identifying the one or more resource centers of the second set of resource centers includes identifying one or more resource centers of the second set of resource centers that serve at least a portion of the specified coverage area.

17. The method of claim 15, wherein the first set of resource centers include a particular resource center that serves a particular coverage area, and wherein the second set of resource centers include a plurality of resource centers that, together, serve at least one of:
the particular coverage area, or
a subset of the particular coverage area,
wherein the particular resource center is associated with a particular measure of latency, and wherein the plurality of resource centers of the second set of resource centers are each associated with a respective measure of latency that is lower than the particular measure of latency.

18. The method of claim 15, wherein the request specifies a quantity of requested resources, and wherein configuring the one or more resource centers of the second set of resource centers includes provisioning the specified quantity of resources at the one or more resource centers of the second set of resource centers.

19. The method of claim 15, further comprising:
configure one or more resource centers of the first set of resource centers to satisfy at least another portion of the request, wherein the configuration of the one or more resource centers of the first set of resource centers and the one or more resource centers of the second set of resource centers fully satisfies the request.

20. The method of claim 15, wherein a particular resource center, of the first set of resource centers, serves as an aggregator for traffic received via a plurality of resource centers of the second set of resource centers.

* * * * *